Nov. 18, 1930.    K. TESSKY    1,782,324
SHAFT COUPLING
Filed June 30, 1925
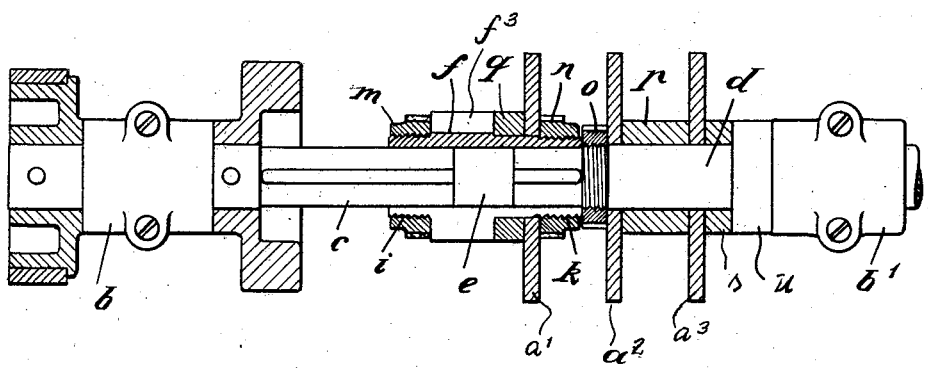
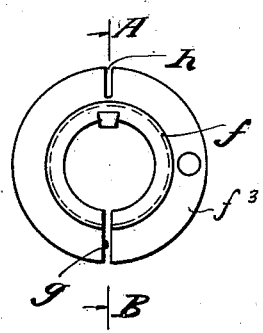 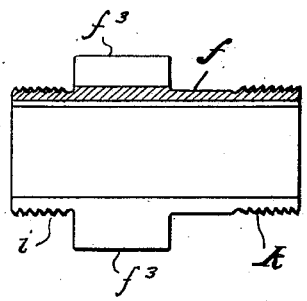
Inventor:
Karl Tessky Patented Nov. 18, 1930

1,782,324

UNITED STATES PATENT OFFICE

KARL TESSKY, OF ESSLINGEN-ON-THE-NECKAR, GERMANY

SHAFT COUPLING

Application filed June 30, 1925, Serial No. 40,650, and in Germany July 21, 1924.

My invention refers to shaft couplings and more especially to a device of this kind which allows securing on one or both shafts certain parts such as for instance cams in an easily exchangeable manner.

In a preferred embodiment of my invention I secure an axially slotted cylindrical sleeve on the ends of the coaxial shafts which are somewhat spaced apart, and I force this sleeve into frictional engagement with the two shafts by means of a threaded portion at each end of the sleeve acted upon by a nut, the thread being formed to enable it to exert a wedge-like action on the nut on the one hand and on the shaft on the other hand. To this end the thread is formed of a spirally disposed surface inclined to the axis of the shaft or shafts, which is identical with the line of thrust, at a comparatively small angle, for instance 10°, and of another spirally disposed surface inclined to the said line of thrust at a larger angle, for instance 80°, the spiral surface of small inclination being of greater width and, in cooperation with a nut provided with an internal thread of substantially corresponding configuration, acting like a wedge, whenever the nut has been screwed home on the sleeve into contact with an abutment which may be constituted by a flange provided on the sleeve or by a cam mounted on the sleeve and abutting against such flange, or by other means. A slotted cylindrical sleeve provided with wedge-shaped thread as described will exert a similar clamping action as the slotted conical sleeve hitherto used for this purpose.

In the drawings affixed to this specification and forming part thereof a device embodying my invention is illustrated diagrammatically by way of example.

In the drawings,

Fig. 1 is an elevation, partly in section,

Fig. 2 is an end elevation of the coupling sleeve,

Fig. 3 is a longitudinal section of the sleeve on the line A—B in Fig. 2, and Fig. 4 is an elevation of the thread profile, drawn to a larger scale.

Referring to the drawings, $c$ and $d$ are coaxial shafts supported in bearings $b$ and $b'$, respectively. Adjoining ends of the shafts are spaced apart so that a gap $e$ is formed between them through which the cams or the like $a'$, $a^2$, $a^3$, secured on the shaft $d$, can be readily inserted and removed. The gap is bridged by a cylindrical sleeve $f$ on which a flange $f^3$ is formed. The sleeve $f$ is divided longitudinally at $g$ and its flange $f^3$ is slotted diametrically opposite the slot $g$ at $h$ down to the body of the sleeve so that the sleeve is resilient and capable of yielding to radial pressure.

The ends of the sleeve are threaded at $i$ and $k$, the threads preferably having the profile shown in Fig. 4, the spiral surface $x$ of greater width being inclined to the line of thrust at a small angle, the spiral surface $y$ at a large angle. Nuts $m$ and $n$ are placed on the threaded ends.

When these nuts are set, a wedge-like action is exerted on the threaded parts which causes the resilient sleeve $f$ to hug tightly the ends of the shafts $c$ and $d$.

The first cam $a'$ is directly held by the nut $n$ and the flange $f^3$ of the sleeve $f$, and a washer $q$ may be inserted between the cam or the like $a'$ and the flange. The cams $a^2$ and $a^3$ are secured by means of a nut $o$ and washers $p$ and $s$, the washer $s$ abutting against a shoulder $u$ on the shaft $d$.

When it is desired to exchange the cams or the like, the nuts $m$ and $n$ are unscrewed so as to release the sleeve $f$ which is then displaced on the shaft $c$ so as to lay open the gap $e$, and all the cams or the like can now now be exchanged after the nuts $n$ and $o$ have been removed.

I wish it to be understood that I do not desire to be limited to the exact details of construction shown and described, for obvious modifications will occur to a person skilled in the art.

I claim:—

1. The combination with a pair of aligned shafts arranged in sufficiently spaced relation to enable attachment and removal of devices adapted to be operated by said shafts, of a split coupling device threaded at each end and provided intermediate its threads with an annular flange, a clamping nut for each end correspondingly threaded, the thread of the sleeve being formed at one side of its crest with a relatively wide face inclining upwardly away from the flange at a relatively small acute angle with relation to the longitudinal axis of the sleeve whereby to produce compressive action upon the sleeve when the clamping nut co-acts with the flange and at the other side with a narrower reaction face forming a relatively large acute angle.

2. An automatic lathe having a control shaft, a cam on said shaft and means for securing on said control shaft any desired number of exchangeable cams, said means comprising a sleeve surrounding said shaft, a shouldered abutment for one of said cams, a thread on said sleeve and a nut on said thread, said nut engaging a cam from the opposite side of said shoulder and said sleeve being slotted so as to constitute a clamping sleeve.

3. An automatic lathe having a divided cam shaft, a cam on said shaft and means for securing on said shaft any desired number of exchangeable cams, said means comprising a sleeve surrounding said shaft, a shouldered abutment for one of such cams, a thread on said sleeve and a nut on said thread, said nut engaging a cam from the opposite side to said shoulder, and said sleeve being slotted so as to constitute a clamping sleeve, and arranged to bridge the gap in said divided shaft, this gap serving for exchanging the cams.

4. In combination, a shaft in two parts spaced in axial direction to form a gap between them, a longitudinally split sleeve enclosing the adjoining ends of said parts and bridging said gap, a shoulder on said sleeve, a cam disc exchangeably mounted on said sleeve and abutting against said shoulder, and means on said sleeve for holding same in firm engagement with said ends and for holding said cam disc applied against said shoulder.

In testimony whereof I affix my signature.

KARL TESSKY.